Aug. 28, 1945.     Y. E. LEBEDEFF     2,383,659
METHOD OF RECLAIMING MAGNESIUM FROM SCRAP
Filed March 13, 1943
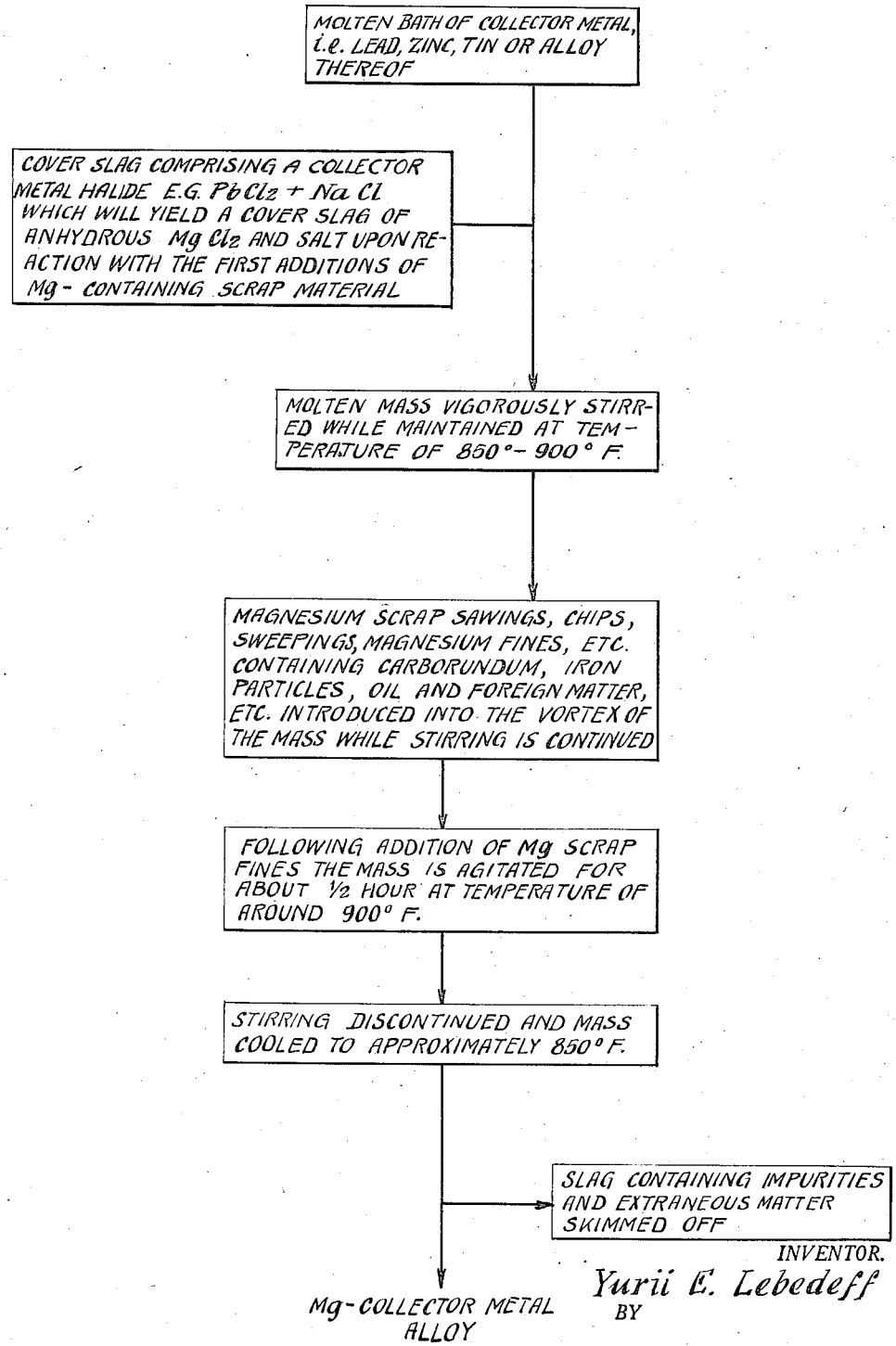
INVENTOR.
Yurii E. Lebedeff
BY
Furman Rinehart
ATTORNEY Patented Aug. 28, 1945

2,383,659

UNITED STATES PATENT OFFICE 2,383,659

METHOD OF RECLAIMING MAGNESIUM FROM SCRAP

Yurii E. Lebedeff, Metuchen, N. J., assignor to American Smelting and Refining Company, New York, N. Y., a corporation of New Jersey Application March 13, 1943, Serial No. 479,067

7 Claims. (Cl. 75—67)

This invention relates to a process for reclaiming magnesium from material containing magnesium, such as, scrap, borings, turnings, sawings, sweepings, etc.

Heretofore, various attempts have been made to utilize scrap magnesium metal directly in metallurgical processes, but this has not proved successful particularly where the scrap material is finely divided and mixed with extraneous matter, such as carborundum, iron, oil and the like. One of the principal difficulties encountered in attempting to use or reclaim magnesium from scrap results from the inherent property of magnesium to take fire and burn rapidly when heated in contact with air. This not only results in loss of the metal but presents a serious fire hazard.

To avoid this it has been customary, when melting magnesium metal scrap consisting of relatively large chunks or pieces, to employ an atmosphere which is relatively inert toward magnesium, for example, sulphur or carbon dioxide. This procedure, however, is impractical when refining finely divided scrap metal containing magnesium metal particles intermixed with foreign matter. Moreover, the method is too expensive to use in reclaiming magnesium metal from low grade secondary material from the standpoint of flux cost, length of cycle and percent of metal recovery.

It is an object of the present invention to provide a commercially feasible method of treating scrap containing magnesium metal particles intermixed with extraneous matter to recover the magnesium metal free from the impurities.

Another object of the invention is to provide a relatively simple, inexpensive but highly effectual method of reclaiming magnesium from finely divided scrap metal in the form of a suitable metal alloy product, which is useful as such, or from which the pure magnesium metal may be readily produced.

These and other objects and advantages will become apparent as the description proceeds wherein a particular commercial embodiment thereof is disclosed. It will be understood, however, that the process and particular correlated steps thereof may be modified by those skilled in the art without departing from the broad scope and spirit of my invention.

In accordance with the present invention a molten bath of metal which readily alloys with magnesium is established in a kettle or suitable receptacle. The metal bath may consist of lead, zinc, tin or the like, and, for convenience, is referred to herein as the collector metal. Over the metal bath is placed a suitable cover slag which functions as a non-oxidizing liquid seal for the collector metal and magnesium scrap material being treated. During treatment the finely divided magnesium scrap metal is fed into this molten bath of collector metal and liquid slag while the bath is vigorously stirred or agitated in such a manner that the scrap particles are quickly immersed and enveloped by the slag avoiding any unnecessary exposure of the scrap and collector metal to air, which would result in rapid oxidation of the metal bath and burning of magnesium.

After establishing the molten bath of collector metal, the cover slag composition, which has preferably been dehydrated, is added to the metal bath. This cover slag may comprise any of the halogen or halide salts, compounds, or mixtures thereof which will form a fluid slag on top of the molten collector metal and function to prevent oxidation of the collector metal and metallic magnesium and, in addition, clean the magnesium metal particles so that when they are brought into intimate contact with the collector metal they will readily alloy therewith leaving the impurities behind in the cover slag. Efficacious results have been obtained using slags comprising alkali or alkaline earth metal salts, i. e., magnesium, calcium, sodium or potassium chloride alone or mixtures thereof or mixtures of calcium chloride and sodium, aluminum or calcium fluorides. Preferably low melting eutectic compositions are employed. The essential characteristics of the slag employed in each case may be enumerated as follows:

(1) The cover slag should have a lower specific gravity than the molten collector metal bath and the resultant Mg-metal alloy product produced.

(2) It should be sufficiently fluid at the temperature of the molten collector metal to readily wet and envelope the magnesium scrap metal immediately upon its introduction yet have no tendency to react with clean magnesium metal particles or hinder their extraction, alloying or occlusion by the collector metal phase.

(3) The slag should have sufficient affinity for the impurities introduced with the magnesium particles to rapidly separate the impurities therefrom and tenaciously retain them in the slag phase while the molten bath and slag is vigorously stirred and intermixed.

(4) Throughout the treatment the slag should not lose its effectiveness as a liquid sealing means for protecting both the magnesium scrap metal introduced and the Mg-alloy metal formed from exposure to air. Likewise it should retain its property of classifying the magnesium metal particles and impurities holding the latter and freeing the former in a substantially chemically clean state.

(5) Finally the slag should be easily melted and remain fluid at sufficiently low temperatures whereby the process can be efficiently carried out using a conventional iron or steel kettle equipped with a suitable stirring means.

The drawing accompanying and forming a part of this specification comprises a flow sheet illustrating a commercial embodiment of the invention. In addition the following specific example is given to further show how the invention may be practised:

*Example*

A bath of molten lead was established in a cast iron kettle equipped with a stirrer and containing a cover slag composed of $PbCl_2$ and NaCl (3.5 $PbCl_2$:1 NaCl). Magnesium scrap, mechanically freed from excess liquid, oil, etc., and previously dried, was introduced into the vortex of the melt while the mass was stirred and maintained heated to approximately 850° F. The initial additions of magnesium scrap react with the $PbCl_2$ producing anhydrous $MgCl_2$ which provides an efficacious flux of low viscosity which rapidly extracts the extraneous matter intermixed with the magnesium scrap metal particles. After sufficient magnesium scrap metal was introduced and reacted to form the $MgCl_2$ cover slag, the temperature of the mass was lowered to about 780° F. and additional magnesium scrap fines added to the vortex of the stirred mass which brought about the release of magnesium metal to the collector lead metal forming a Pb-Mg product. Magnesium fines, as used for this purpose, contained magnesium metal particles admixed with approximately 1% by weight oil and 5% by weight extraneous acid insoluble matter. Other suitable fines containing magnesium metal may, of course, be used with similar results. During continued stirring, magnesium particles, free from extraneous matter, are brought into intimate contact with the molten lead and alloys therewith whereas the foreign matter remains suspended in the molten slag layer. When the desired amounts of scrap has been treated the slag may be removed from the bath in any suitable manner as by skimming and the Pb-Mg alloy metal pumped or tapped from the kettle.

In the process described anhydrous magnesium chloride is formed in situ by the use of $PbCl_2$ which is obtained as a by-product from lead refining processes. About 10% by weight of the magnesium contained in the scrap is used in forming $MgCl_2$ and the resultant lead produced by reduction of the $PbCl_2$ enters the molten lead bath beneath the slag.

Any suitable stirring means may be employed for producing the intimate mixing of the various ingredients. Preferably, however, a stirring mechanism is used which causes the bath to circulate around in such a manner whereby a vortex is formed in the central portion. The finely divided scrap material is added to this vortex and the particles are quickly drawn under the surface of the molten mass so that unnecessary exposure to the air is avoided.

It will be obvious that the percentage amounts of magnesium which can be alloyed with the collector metal may be varied within wide limits in practicing the process of this invention.

Although certain novel features of the invention have been illustrated and described and are pointed out in the annexed claims, it will be understood that various omissions, substitutions and changes in the several steps of the process and its operation may be made by those skilled in the art without departing from the spirit and scope of the invention.

What is claimed is:

1. The process of reclaiming magnesium as an alloy metal from scrap material containing magnesium metal which comprises establishing a bath of molten collector metal which readily alloys with magnesium metal, providing a cover slag for said collector metal which is liquid at the temperature of the molten collector metal and will wet and envelope said magnesium scrap material when the same are brought in contact, said cover slag containing as a major constituent a halide of the collector metal, agitating said metal bath and concurrently introducing the scrap material to be treated, continuing the agitation of said bath to cause the classification of said scrap wherein the extraneous matter is retained in said slag while magnesium metal particles are released therefrom and collected by said collector metal, and separating the slag containing the impurities from said collector metal containing the magnesium metal released.

2. The process of reclaiming magnesium as an alloy metal from scrap material containing metallic magnesium comprising establishing a molten bath of metal alloyable with magnesium, providing a slag cover for said molten bath which floats on top of said molten metal bath and is fluid at the temperature of the molten metal bath and readily wets and envelopes the magnesium scrap metal particles when introduced thereinto, said slag cover including a chloride of the collector metal as a major constituent, admixing said scrap material into said molten metal and slag mass while the same is vigorously stirred, continuing the stirring and introduction of scrap material to cause the extraneous matter to separate from the magnesium metal particles and be suspended in the slag while said magnesium metal alloys with said molten metal forming the bath, and separating said slag containing the impurities and extraneous matter from said magnesium alloy metal.

3. The process of reclaiming magnesium as an alloy metal from secondary metals such as metal scrap sawings, sweepings and the like which comprises establishing a molten bath of lead metal with which magnesium metal alloys whereby it can be collected, providing a cover slag therefor comprising lead chloride as the principal reactant and alkali chloride, which slag is fluid at the temperature of the molten lead bath and seals the molten metal bath from direct contact with air, introducing said scrap material into said molten bath and stirring the mixture causing the slag to envelope the scrap particles and prevent rapid oxidation and burning of the magnesium metal while simultaneously bringing about separation of the magnesium metal particles from the extraneous matter whereby said magnesium metal particles are released therefrom and brought into intimate contact with the molten metal bath where it is collected free of said extraneous matter.

4. The process of reclaiming magnesium from scrap magnesium metal containing extraneous matter intermingled therewith which comprises the steps of establishing a molten bath of lead containing a liquid cover slag composed of a mixture of lead chloride and sodium chloride, the lead chloride of which reacts with magnesium scrap initially introduced forming magnesium chloride in situ, introducing said scrap metal material into said molten mass while said mass is being stirred and heated to maintain the melt liquid with a cover slag containing magnesium chloride as a fluxing constituent, continuing the addition of scrap metal to cause magnesium metal particles to be freed from the extraneous matter admixed therewith and to become alloyed with the molten lead forming said bath, and drawing off said slag which contains said extraneous matter and recovering the magnesium from said lead bath.

5. In the process of recovering magnesium metal in the form of an alloy from scrap material containing magnesium metal particles, the step of extracting the magnesium metal from said scrap material by intermixing said scrap with a molten bath of lead which will alloy with magnesium metal and wherein said lead bath is provided with a liquid cover halide slag which contains lead chloride in effective amounts to react with initial additions of magnesium scrap forming magnesium chloride and seals the molten metal and intermixed magnesium metal particles against unnecessary exposure to air while the process is being carried out.

6. The process of reclaiming magnesium metal from scrap material containing metallic magnesium which comprises establishing a bath of molten lead, providing a liquid cover fluxing slag layer over said molten lead bath, said cover slag containing a halide of lead for reacting with initial additions of the magnesium scrap to form magnesium halide, introducing said scrap material into the molten lead bath through said slag cover layer thereby preventing oxidation and burning of said metallic magnesium, stirring the mixture to cause the slag to flux away the impurities intermingled with the magnesium metal particles and retain the same while releasing said metallic magnesium, vigorously stirring said bath whereby said released magnesium particles are brought into intimate contact with the molten lead metal of the bath so as to form an alloy therewith which is usable as such or from which substantially pure magnesium may be recovered by fractional distillation.

7. The process for recovering magnesium from magnesium scrap comprising the steps of establishing a molten bath of a collector metal which is alloyable with magnesium, adding a flux thereto which includes as a major constituent a halide of the collector metal and melting it to form a fluid cover slag, treating this cover slag with magnesium scrap to convert all the halide of the collector metal present to anhydrous halide of magnesium with accompanying liberation of collector metal, introducing additional magnesium scrap to the resultant mixture of collector metal and cover slag containing magnesium halide to cause magnesium metal particles to be freed from the extraneous matter of the scrap and become alloyed with the molten collector metal, and separating the slag containing said extraneous matter from the magnesium collector metal alloy.

YURII E. LEBEDEFF.